(12) United States Patent
Voigt et al.

(10) Patent No.: US 7,166,939 B2
(45) Date of Patent: Jan. 23, 2007

(54) ELECTRIC HAND TOOL

(75) Inventors: Mike Voigt, Gaildorf (DE); Erhard Hoffmann, Leinfelden-Echterdingen (DE); Frank Fuchs, Rutesheim (DE); Martin Schulz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/304,302

(22) Filed: Dec. 15, 2005

(65) Prior Publication Data
US 2006/0175915 A1 Aug. 10, 2006

(30) Foreign Application Priority Data
Dec. 23, 2002 (DE) .............. 102 61 572

(51) Int. Cl.
*H02K 37/00* (2006.01)
(52) U.S. Cl. .............. 310/47; 310/50; 310/63
(58) Field of Classification Search ........ 310/47, 310/50, 59, 60 R, 60 A, 61–63
See application file for complete search history.

(56) References Cited

U.S. PATENT DOCUMENTS

| | | | | |
|---|---|---|---|---|
| 2,546,846 | A * | 3/1951 | Atkin ............ | 310/83 |
| 3,652,879 | A * | 3/1972 | Plunkett et al. ...... | 310/50 |
| 5,315,193 | A * | 5/1994 | Kummer et al. ...... | 310/50 |
| 6,543,549 | B1 * | 4/2003 | Riedl et al. ......... | 173/216 |
| 6,703,754 | B1 * | 3/2004 | Finkenbinder et al. ... | 310/227 |
| 2004/0124721 | A1 * | 7/2004 | Pfisterer et al. ...... | 310/51 |

* cited by examiner

Primary Examiner—Thanh Lam
(74) Attorney, Agent, or Firm—Michael J. Striker

(57) ABSTRACT

An electric hand tool having a machine housing, with an electric motor accommodated in the machine housing for driving a tool, and a fan wheel accommodated in the machine housing for generating a main cooling air current that flows from a main air inlet to a main air outlet through the machine housing, which said fan wheel creates a suction space and a pressure space on opposite sides when it rotates, wherein means for generating an additional air current are provided and configured such that the additional air current flows onto at least one machine component that is located outside of or in a low-flow region of the main cooling air current, wherein the electric motor includes a motor winding with winding heads that project outward on at least one end face of the electric motor, the fan wheel is located with axial clearance in front of the end face of the electric motor and is configured such that the suction space is located in front of the end face of the electric motor where the winding heads are located, and the means for generating the additional air current have additional air inlets that lead into the suction space, wherein the additional air inlets are passages located in a dividing wall that separates the pressure space from the suction space and, preferably, the passages are separated from the axis of the fan wheel by the greatest radial distance possible.

4 Claims, 4 Drawing Sheets

ELECTRIC HAND TOOL

BACKGROUND OF THE INVENTION

The present invention is directed to an electric hand tool.

With an electric hand tool of this type (DE 196 00 339 C1), fan guide vanes are located on either side of a fan wheel that is mounted on the motor shaft between the electric motor and gearbox, in order to improve the cooling of the electric motor and a gearbox that is located between the electric motor and a drive spindel for a tool, which said fan guide vanes cool the electric motor and the gearbox separately and independently of one another via corresponding air ducts.

With an electric hand tool having an impact mechanism (DE 100 30 962 C2), an annular channel with an opening on the outside is formed in the impact region of the snap die, which said opening is connected to the suction side of a ventilation system of the electric motor. The dust that is produced in the abrasive process of removing material, which said material also penetrates the working area of the snap die, is suctioned away from this area through the annular channel by the vacuum generated by the ventilation system.

SUMMARY OF THE INVENTION

The electric hand tool according to the invention has the advantage that greater performance and longer idle periods for the machine components and the electric hand tool as a whole can be obtained by purposefully cooling machine components that are subject to warming and are not ventilated at all or inadequately by the cooling air current that is generated by the fan wheel, which is preferably driven by the electric motor, by means of the additional air current that is diverted from the cooling air current or injected additionally from the outside. In contrast to the known electric hand tools, no dead air space regions develop, in which components are not cooled. The improved cooling can increase the performance of the electric hand tool with the same housing cross-section, or the housing cross-section can be reduced in size in the region of the electric motor while retaining the same performance. No additional production costs are incurred, since the means for the additional air current can be designed such that they can be produced at the same time as the machine housing or fan wheel.

According to an advantageous embodiment of the invention, the electric motor has a motor winding with winding heads that project outward on at least one end face of the electric motor, and the fan wheel is located with axial clearance in front of the end face of the drive motor and is configured such that the suction space is located directly in front of the end face of the drive motor on which the winding heads are carried. The means for generating the additional air current have air inlets that lead into the suction space. The fan wheel can be configured as an axial, diagonal or radial fan wheel. This structural configuration has the advantage that additional air is supplied through the air inlets that lead into the suction space, which said air inlets reach the "dead air space regions", inside the suction space, where the winding heads are located. Said dead air space regions are produced because the cooling air current that is drawn in by the fan wheel flows substantially through the working air gap between the rotor and stator and into the suction space and, from there, it is blown over the fan wheel vanes into the pressure space without reaching the winding heads of the motor winding that are located toward the outside relative to the working air gap.

According to an advantageous embodiment of the invention, the air inlets are openings that are configured in the wall of the machine housing at or near the end face of the electric motor. With this configuration of the air inlets, the amount of air in the cooling air current that is flowing into the suction space is increased by the amount of air drawn in from the outside through the openings. At the same time, air is directed in purposeful and efficient fashion past the winding heads without any noteworthy additional costs being incurred.

According to an advantageous embodiment of the invention, the air inlets are openings in a dividing wall that separates the pressure space from the suction space, which said openings are preferably located with the greatest radial clearance possible from the axis of the fan wheel. The dividing wall can be fixed in position, and it can be part of the machine housing or part of the fan wheel, and it can rotate with said fan wheel. By means of this "internal injection", a portion of the air flowing into the pressure space is directed, as additional air, from the pressure space back into the suction space. It is thereby directed past the winding heads to be cooled without requiring any additional components or production costs. By making the openings larger or smaller, the amount of air flowing back into the suction space can be controlled very well. Openings to the outside, as used in the case of "external injection" described hereinabove, are eliminated, which also rules out an additional contamination risk.

According to an alternative embodiment of the invention, the means for generating the additional air current have air guide elements that divert a sub-current, as the additional air current, from the cooling air current to the machine components that are poorly ventilated by the cooling air current. Although this does not increase the cooling air current, the cooling air current is divided into branches such that purposeful and efficient cooling of individual machine components is obtained. The additional costs required to produce and install the air guide elements is minimal.

According to an advantageous embodiment of the invention, the means for generating the additional air current have at least one air duct guided in the machine housing; one end of the duct is located in the cooling air stream, and the other end of the duct is located at or near the machine component. This has the advantage that machine components, such as electrical, electronic or mechanical components that are not located directly in the vicinity of the cooling air stream that is flowing through the machine, are cooled well and therefore have a longer service life and can be designed smaller in size. This reduces structural volume and lowers the costs to fabricate the components. At the same time, greater structural and design-oriented freedom is obtained in terms of configuring the electric hand tool, since components that work fine without cooling no longer need to be located in the immediate vicinity of the cooling air current. Instead, they can be placed anywhere, due to the air duct according to the invention. Preferably, the air duct is positioned such that the duct inlet is close to the machine component to be ventilated, e.g., the on/off switch for the electric motor, and the duct outlet leads into the suction space of the fan wheel.

According to a preferred embodiment of the invention, the at least one air duct is integrated directly in the plastic wall of the machine housing. As a result, no additional production costs for the air duct would be incurred, since said air duct can be formed when the machine housing is produced.

According to an advantageous embodiment of the invention, the electric motor, which is designed as a commutator motor, e.g., a universal motor, has a commutator with commutator brushes. The means for generating the additional air current have air turbulence-generating elements that encircle the periphery of the commutator and are configured such that the additional air current they generate flows across the commutator surface. The air turbulence-generating elements can be located on the commutator itself, or they can be the fan wheel vanes of an axial fan wheel that is joined with the commutator in torsion-proof fashion, e.g., it is mounted together with the commutator on the driven shaft of the electric motor in torsion-proof fashion. Said structural features increase the overall amount of cooling air that flows through the machine housing, and permits optimum flow of cooling air onto the commutator and commutator brushes. With commutator motors having a short structural shape, the axial fan wheel is designed as a plastic disk that is mounted in torsion-proof fashion on the driven shaft of the drive motor, on the periphery of which said plastic disk the fan wheel vanes are equidistantly located as small, bent segments. The advantage of this is that, due to the plastic disk, a sufficiently large creepage distance is retained between the pivot bearing and the commutator, despite the short structural shape.

According to an advantageous embodiment of the invention, the brush cartridges for holding and guiding the commutator brushes are equipped with cooling ribs, through which the air current generated by the axial fan wheel flows. The large surface area of the cooling ribs ensures substantially improved heat dissipation at the brush cartridges and the commutator brushes, which permits in longer idle periods for the commutator brushes.

BRIEF DESCRIPTION OF THE DRAWING

The invention is described in greater detail in the description below with reference to the embodiments shown in the drawing.

DESCRIPTION OF THE PREFERRED EMBODIMENTS

Figure 1:
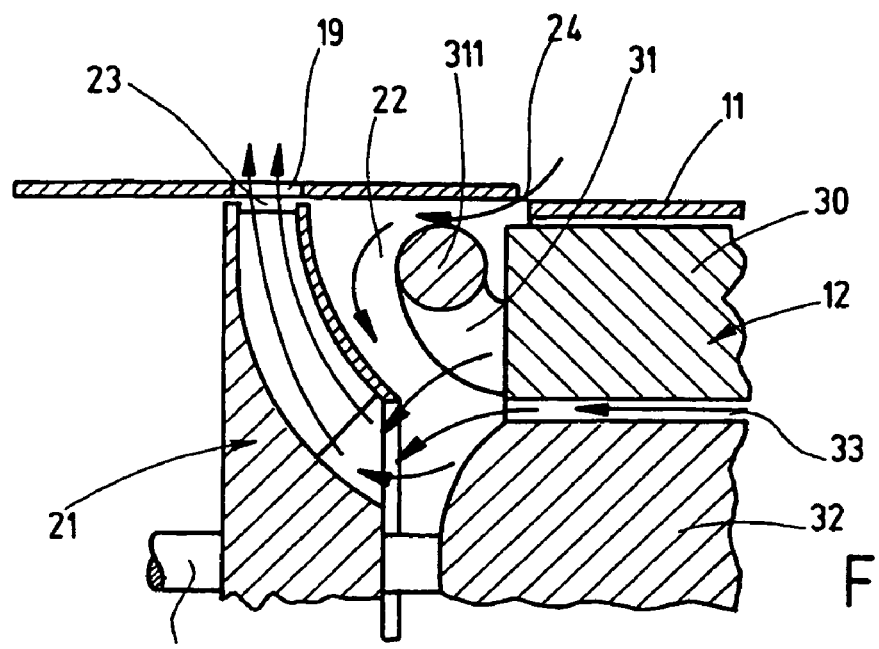
FIG. 1 is a schematic representation of a section of a longitudinal cross-section of an electric hand tool.
Figure 6:
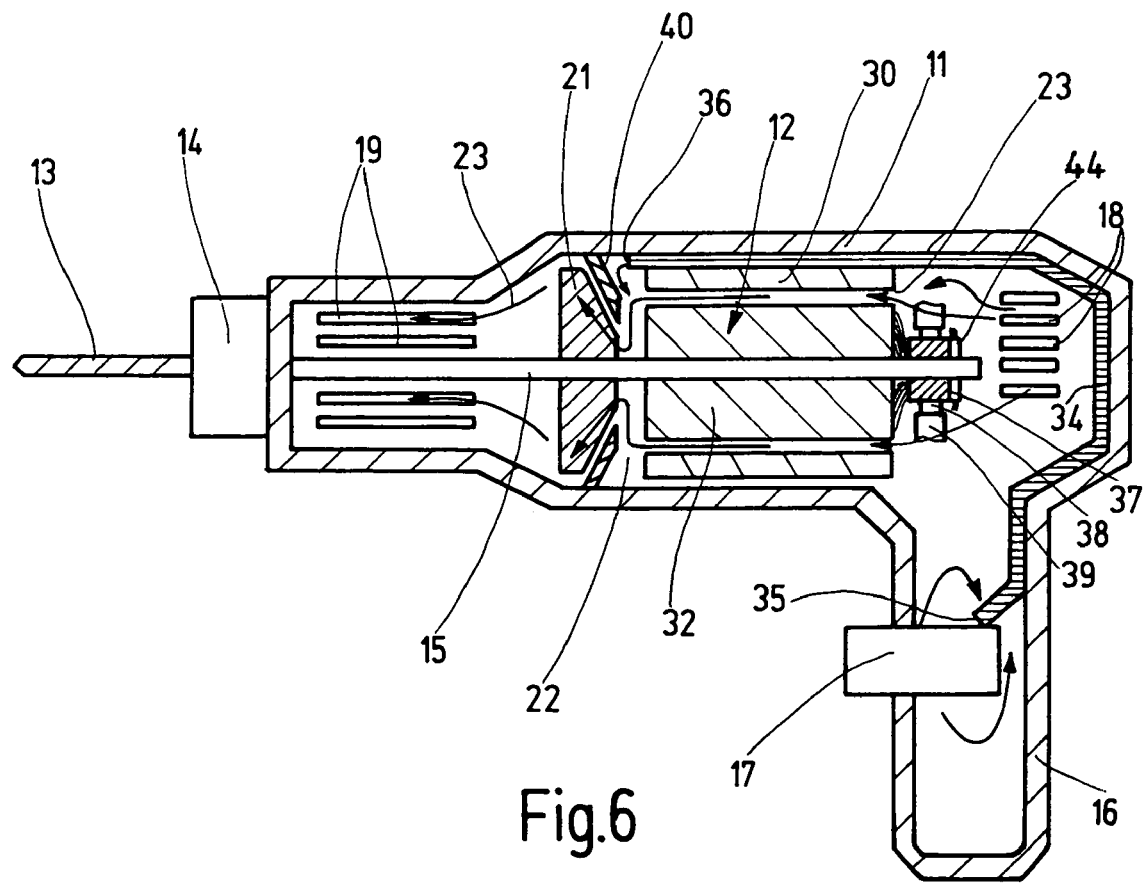
FIG. 6 is a schematic representation of a longitudinal section of an electric hand tool according to a further embodiment.

The electric hand tool, e.g., an electric hand-held drill, shown in FIG. 1 in a sectional view and in FIG. 6 in a complete view, includes, in known fashion, a machine housing 11, in which an electric motor 12 for a tool 13, e.g., a drill bit, is accommodated. As depicted in FIG. 6 in principle only, tool 13 is clamped in a tool receptacle 14, e.g., a drill chuck, which is mounted in torsion-proof fashion on a drive spindle, which is driven by a gearbox (not shown in FIG. 4) by driven shaft 15 of electric motor 12 depicted here as a commutator motor, as an example.

As shown in FIGS. 1 and 6, electric motor 12 includes a stator 30 with stator or field winding 31 (FIG. 1) and a rotor 32 that is mounted in torsion-proof fashion on driven shaft 15, which said rotor is concentrically surrounded by stator 30, with an air gap 33 between said rotor and said stator. Field winding 31 is inserted in known fashion in axial grooves in stator 30 and projects via winding heads 311 out of said stator on both end faces of stator 30. A rotor winding that is inserted in rotor 32, but is not shown in FIGS. 1 and 6, is connected to the commutator bars of a commutator 37 that is mounted in torsion-proof fashion on driven shaft 15. At least two commutator brushes 38 serve to conduct current to the rotor winding, each of which said commutator brushes is accommodated in axially displaceable fashion in a brush cartridge 38, and each of which is pressed radially against the commutator bars of commutator 37 using spring pressure. Brush cartridges 38 are fixed in position on a brush holder located in machine housing 11. An on/off switch 17 is located in an easily accessible location in a handle 16 that is integrally formed on machine housing 11, for switching electric motor 12 on and off (FIG. 6).

The electric hand tool is air-cooled and includes a fan that is configured as an axial or radial fan, for cooling electric motor 12 and gearbox, which said fan draws in air through air inlet slits 18 that are formed in the rear region of machine housing 11, and blows air out through air outlet openings 19 that are formed in the front region of machine housing 11. For this purpose, a fan wheel 21 is mounted—downstream of the air current and directly behind electric motor 12—on driven shaft 15 in torsion-proof fashion, so that fan wheel 21 is positioned between electric motor 12 and gearbox on the side furthest from commutator 37. When fan wheel 21 rotates, it produces a suction space 22 on its side closest to drive motor 12, and a pressure space 23 on its other side, which is furthest from said drive motor, which said pressure space is connected with air outlet openings 19. As a result, as indicated by the flow arrows in FIGS. 1 and 6, air is drawn in from the environment through air inlet openings 18 and through annular gap 33 in electric motor 12, whereby the air absorbs heat produced in electric motor 12. Finally, the warmed air is blown back out into the environment through air outlet openings 19.

Due to the high internal air resistance of the electric hand tool and the high flow speed of the air inside air gap 33, a sufficient amount of cooling air does not always reach components to be cooled, e.g., winding heads 311 of field winding 31 that are shown on the left side of FIG. 1 and which are located downstream from the cooling air current, so that said cooling air can carry away enough heat from here. In order to eliminate this inadequacy, air inlets that lead into suction space 22 are provided in embodiments of the electric hand tool depicted in FIGS. 1 and 2 in order to generate an additional air current. Due to the position of the air inlets, the additional air is directed into suction space 22 such that the additional air flows past winding heads 311 in suction space 22, where it absorbs a sufficient amount of heat from winding heads 311. In the embodiment of the electric hand tool according to FIG. 1, said air inlets are slit-shaped air inlet openings 24 that are formed in the wall of machine housing 11 within the region of suction space 22. Air inlet openings 24 are preferably distributed evenly around the periphery of machine housing 11 and are located in the immediate vicinity of the end face of electric motor 12 or its stator 30. As the air flow arrows drawn in FIG. 1 show, when fan wheel 21 rotates, the cooling air current as well as additional air from the environment flows through air inlet openings 24, over winding heads 311, and into suction space 22. Said additional air effectively cools winding heads 311 and, therefore, field winding 31, and increases the amount of cooling air in suction space 22.

Figure 2:
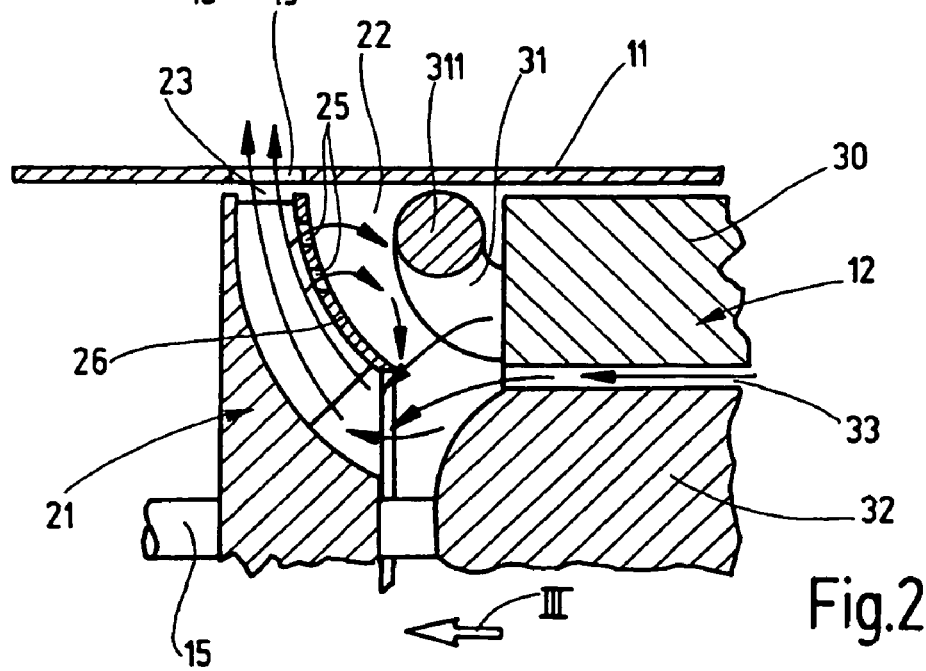
FIG. 2 is the same depiction as in FIG. 1, according to a further embodiment.

In the embodiment of an electric hand tool shown in a sectional view in FIG. 2, the air inlets are passages 25 that are formed in a portion of fan wheel 21, which said portion divides suction space 22 from pressure space 23. As the air flow arrows drawn in FIG. 2 show, when fan wheel 21 rotates, a portion of the air from pressure space 23 does not flow through air outlet openings 19. Instead, the vacuum in suction space 22 causes said portion of air to flow through passages 25 into suction space 22. Since passages 25 are located close to the outer edge of fan wheel 21, the additional air drawn from pressure space 23 flows over winding heads 311, and is then guided by fan wheel 21 back into pressure space 23.

Figure 3:
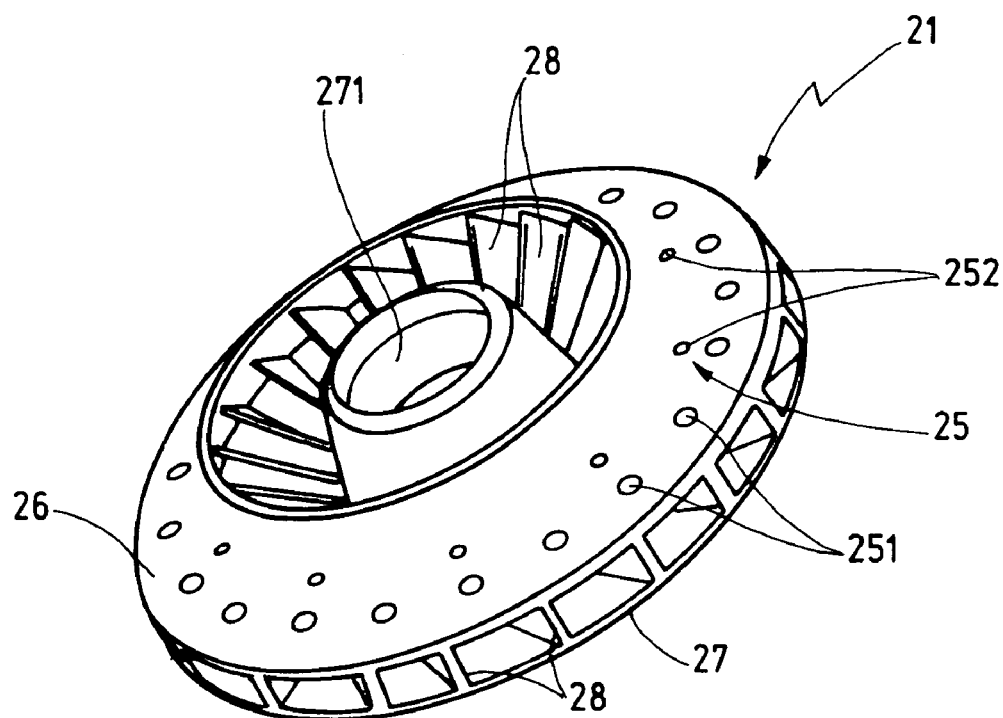
FIG. 3 is a view in the direction III in FIG. 2 of a structural configuration of a fan wheel in the electric hand tool according to FIG. 2, depicted with perspective, FIG. 4 show the same depiction as in FIG. 1, in accordance to a third and 5 and fourth embodiment.

Fan wheel 21, which is shown in a sectional view of a longitudinal cross-section in FIG. 2 as a schematic representation, is shown in FIG. 3 in a top view with perspective in a real embodiment as a radial fan wheel. When fan wheel 21 is mounted on driven shaft 15, the top-view side in FIG. 3 faces electric motor 12. Fan wheel 21 includes an annular cover plate 26 that borders suction area 22, a base plate 27—that has axial clearance from said cover plate—with a central hub 271 for sliding onto driven shaft 15, and radially oriented fan vanes 28 that are located between cover plate 26 and base plate 27. Passages 25 are located in cover plate 26 in the form of circular holes 251, 252. For example, holes 251 having the larger diameter are located on an outer perimeter, and holes 252 having the smaller diameter are located on a concentric, inner perimeter having a smaller diameter. The size of the holes and the distance between them are purposefully selected in order to prevent an undesired reduction in the efficiency of the radial fan caused by the injection of an excessive volume of air from pressure space 23 into suction space 22. Locating holes 251 having the larger diameter on the outer perimeter is advantageous because the greater portion of the air injected into suction space 22 flows in the region of winding heads 311 of field winding 31. Passages 25 can have any cross-sectional shape. For example, said passages can be configured as slits.

Figure 4:
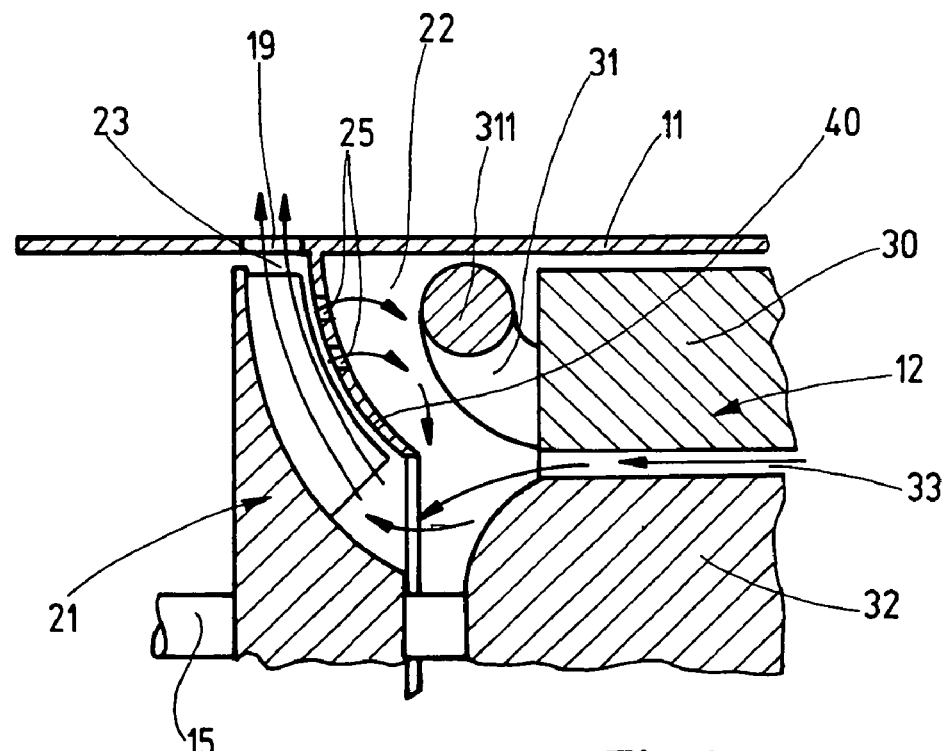

With the embodiment of the electric hand tool that is shown as a sectional view in FIG. 4, fan wheel 21 is modified such that cover plate 26 with passages 25 is eliminated, and the dividing wall function of cover plate 26 is now performed by a dividing wall 40 that is fixed in position, which said dividing wall is part of machine housing 11. Passages 25 are located in dividing wall 40 in the same manner as described hereinabove in conjunction with cover plate 26. Dividing wall 40, which is configured as a hollow cylinder having the shape of a pagoda, can be designed integral with machine housing 11, or it can be mounted, as a separate structural component, on the wall of machine housing 11.

Figure 5:
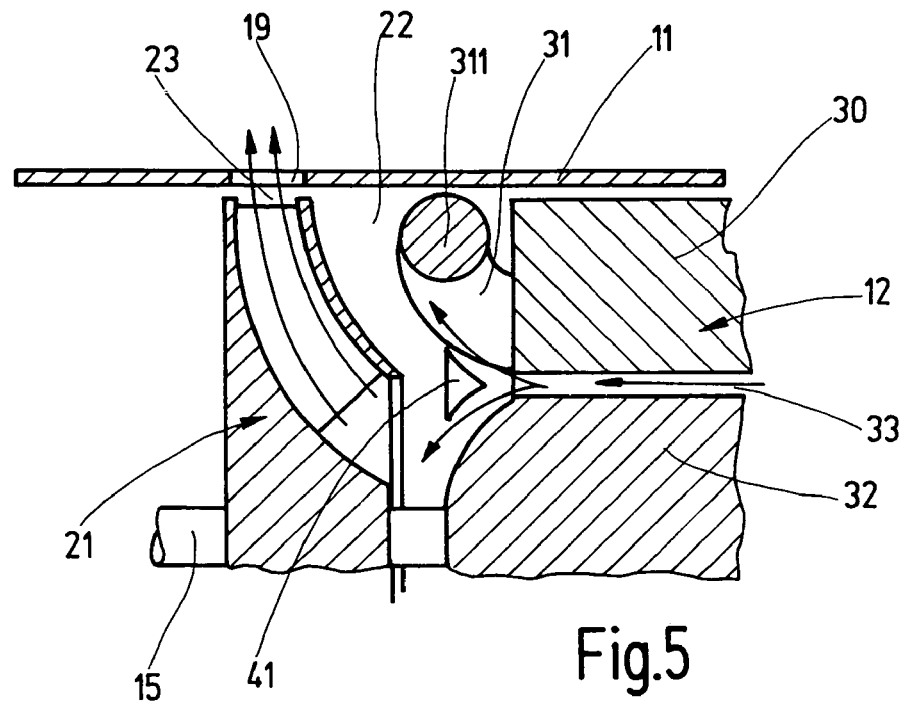

With the embodiment of the electric hand tool shown in FIG. 5, the air inlets in the suction space are eliminated in order to increase the size of the cooling air mass in suction space 22 and, instead, the additional current that flows onto winding heads 311 branches off from the cooling air current. For this purpose, at least one air guide element 40 is located in suction space 22 such that a sub-current of the cooling air current that flows in through air gap 33 between stator 30 and rotor 32 into suction space 22 branches off such that it forms the additional air current that flows onto winding heads 311. Radial fan wheel 21 is configured as described in connection with FIG. 2, but cover plate 26 does not contain passages. Of course, fan wheel 21 can also be configured as shown in FIG. 4. Fixed dividing wall 40, which would then be required, does not have passages in this case, either.

Figure 7:
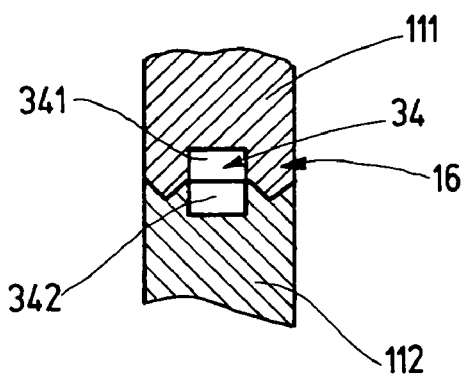
FIG. 7 shows a section of an enlarged section of a portion of a wall of the machine housing of an electric hand tool that has been modified relative to FIG. 6.

In order to also cool components in the electric hand tool that cannot be positioned in the cooling air current that forms between air inlet slits 18 and air outlet openings 19, such as electrical on/off switch 17 installed in handle 16 as shown in FIG. 6, special air ducts are provided in machine housing 11, with which air is drawn in over the electrical, electronic or mechanical components to be cooled, such as on/off switch 17. An air duct 34 of this type is shown in FIG. 6. Said air duct extends along the inner wall of machine housing 11 and has a duct inlet 35, which is located in the region of on/off switch 17, and a duct outlet 36, which leads into suction space 22. When fan wheel 21 rotates, the vacuum that is generated in suction space 22 causes air to be drawn in at duct inlet 35, which said air flows in from the outside due to installation tolerances of on/off switch 17 in housing 11. Said air flows over on/off switch 17 and past it. After it absorbs heat at on/off switch 17, said air is drawn into air duct 34. Advantageously, air duct 34 is integrated in the wall of machine housing 11, as shown in FIG. 7. Machine housing 11, which is formed via injection molding of plastic, is joined in a plane of symmetry that passes through the longitudinal axis of the electric hand tool. To integrate air duct 34 in machine housing 11, one half 341 or 342 of air duct 34 is configured in each housing shell 111 and 112. When the two housing shells 111 and 112 are joined, the two duct halves 341, 342 combine to form air duct 34, as shown in a sectional view in FIG. 7 for the region of handle 16.

In addition to air duct 34, which was described as an example, for ventilating and cooling electrical on/off switch 17, further air ducts having a similar configuration may be guided to other electrical or electronic or mechanical components inside machine housing 11. It is advantageous, for example, with an electric hand tool that is designed as a battery pack-operated machine, to guide an air duct to the battery pack and thereby passively cool the battery pack. The cooling effect of air ducts 24 is independent of whether fan wheel 21 works using "external air injection" (FIG. 1) or "internal air injection" (FIG. 2), or whether injection of this type is eliminated altogether. In the case of "external air injection" according to FIG. 1, air ducts 34 can be utilized instead of or in addition to air inlet openings 24 to draw in additional air from the outside.

Figure 8:
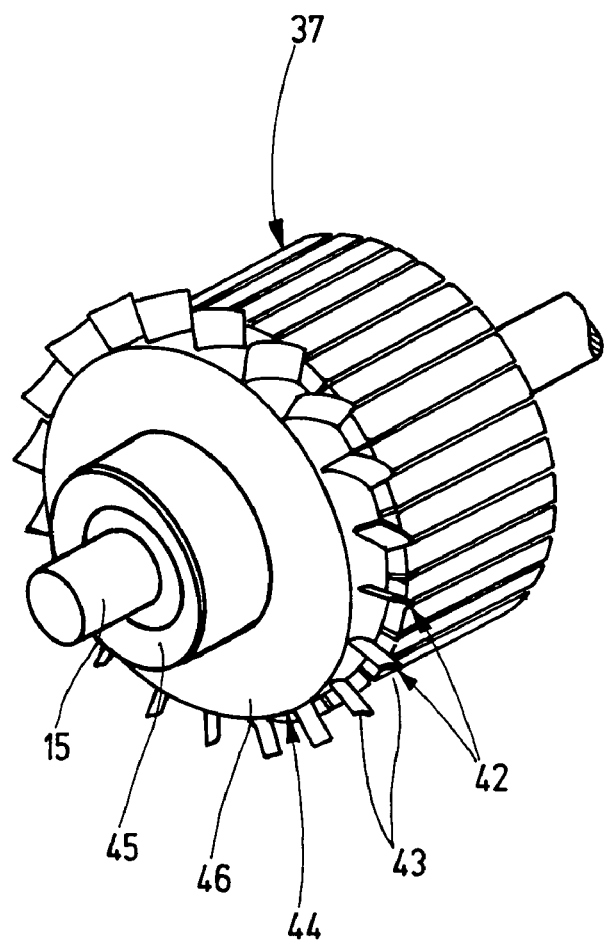
FIG. 8 is an enlarged, perspective view of the commutator of the electric motor in the electric hand tool according to FIG. 6.
Figure 9:
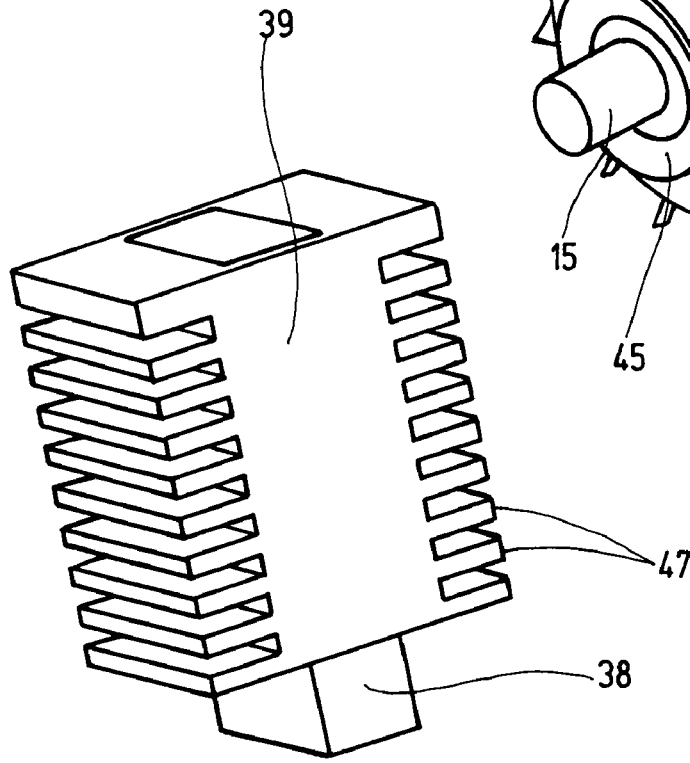
FIG. 9 is an enlarged, perspective view of a brush cartridge of the electric motor in the electric hand tool according to FIG. 6.

Commutator 37 of electric motor 12 is a machine component of the electric hand tool that is subjected to high levels of thermal stress. In order to improve the cooling of commutator 37 and commutator brushes 38 that ride on commutator 37, air turbulence-generating elements 42 are located on commutator 37, which rotate with commutator 37. Said air turbulence-generating elements 42 can be mounted directly on commutator 37. In the embodiment of commutator 37 shown in FIG. 8, fan vanes 43 of an axial fan wheel 44 are air turbulence-generating elements 42, which said axial fan wheel is mounted together with commutator 37 on driven shaft 15 of electric motor 12. Axial fan wheel 44 is located between a pivot bearing 45 of driven shaft 15—which said pivot bearing is accommodated in machine housing 11—and commutator 37, that is, on the end face of commutator 37 that is furthest from rotor 32. Axial fan wheel 44 is preferably configured as a plastic disk 46 that is mounted on driven shaft 15 in torsion-proof fashion, with fan vanes 43 formed by bent axial segments mounted on the periphery of said plastic disk. The advantage of this is that, due to plastic disk 46, a sufficiently large creepage distance is retained between pivot bearing 45 and commutator 37, despite a short structural shape of electric motor 12. When driven shaft 15 rotates, fan vanes 43 generate an air current in addition to the cooling air current that is generated by fan wheel 21, which said additional air current flows across the surface of commutator 37 and commutator brushes 38 and increases the amount of air in the cooling air current.

To enhance the cooling of commutator brushes 38, brush cartridges 39 are equipped with cooling ribs 47, through which the additional air current flows. Since the surface area of brush cartridges 39 is greatly increased by cooling ribs 47, the dissipation of heat from commutator brushes 38—which are held axially inward in displaceable fashion—is markedly improved.

The invention is not limited to the embodiments described hereinabove. For example, in the embodiment shown in FIG. 1, fan wheel 21 can be configured such that its pressure space is located in front of the end face of electric motor 12 on which winding heads 311 are mounted. In this case as well, an additional air current would be drawn over winding heads 311 through openings that are equivalent to air inlet openings 24 in the wall of machine housing 11, and would provide better cooling of winding heads 311. Likewise, air ducts 34 in machine housing 11 can be positioned such that their duct inlet is located in pressure space 23 formed by fan wheel 21, and their duct outlet is located at the machine component 17 to be cooled.

What is claimed is:

1. An electric hand tool comprising a machine housing (11), with an electric motor (12) accommodated in the machine housing (11) for driving a tool (13), and a fan wheel (21) accommodated in the machine housing (11) for generating a main cooling air current that flows from a main air inlet (18) to a main air outlet (19) through the machine housing (11), which said fan wheel creates a suction space (22) and a pressure space (23) on opposite sides when it rotates, wherein means for generating an additional air current are provided and configured such that the additional air current flows onto at least one machine component that is located outside of or in a low-flow region of the main cooling air current, wherein the electric motor (12) includes a motor winding (31) with winding heads (311) that project outward on at least one end face of the electric motor (12), the fan wheel (21) is located with axial clearance in front of the end face of the electric motor (12) and is configured such that the suction space (22) is located in front of the end face of the electric motor (12) where the winding heads (31) are located, and the means for generating the additional air current have additional air inlets that lead into the suction space (22), wherein the additional air inlets are passages (25) located in a dividing wall (40; 26) that separates the pressure space (23) from the suction space (22) and, preferably, the passages (25) are separated from the axis of the fan wheel by the greatest radial distance possible.

2. The electric hand tool as recited in claim 1, wherein the dividing wall (40) is fixed in position, and is mounted on the machine housing (11), or it is part of the machine housing (11).

3. The electric hand tool as recited in claim 1, wherein the dividing wall rotates with the fan wheel (21) and is an integral part of the fan wheel (21).

4. The electric hand tool as recited in claim 3, wherein the fan wheel (21) has a base plate (27) with a hub (271) for sliding onto a driven shaft (15) of the electric motor (12), a cover plate (26) that has axial clearance from the base plate (27) and forms the dividing wall, and radially oriented fan vanes (28) that are located between the base and cover plate (27, 26), and the main air outlet has air outlet openings (19) are located in the wall of the machine housing (11) on the pressure side of the fan wheel (21) in the region of the vane ends.

* * * * *